Patented May 26, 1942

2,284,287

UNITED STATES PATENT OFFICE 2,284,287

ETHERS OF PROTOCATECHUIC ALDEHYDE

Lucas P. Kyrides, Webster Groves, Mo., assignor to Monsanto Chemical Company, St. Louis, Mo., a corporation of Delaware No Drawing. Application May 18, 1939, Serial No. 274,360

3 Claims. (Cl. 260—600)

The present invention relates to novel aromatic materials and flavoring materials for use in the preparation of various foodstuffs including confectionery, bakery products, preserves, ice cream, syrups and the like, and relates more specifically to 3-monophenyl and 3-monocyclohexyl ethers of protocatechuic aldehyde (3,4-dihydroxy-benzaldehyde) and their homologues of the general formula

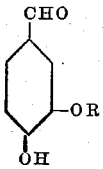

in which R may be a phenyl, alkyl phenyl, cyclohexyl or alkyl cyclohexyl radical.

Heretofore, vanillin has been used extensively in lieu of vanilla bean extract. The vanilla bean extract contains constituents other than vanillin which impart thereto its characteristic flavor. In order to modify and fortify vanillin to more nearly approximate the extract of vanilla bean, other constituents are added thereto. These modifying constituents include coumarin, the ethyl ether of vanillin which is known to the industry as "Ethavan," the benzyl ether of pyrocatechuic aldehyde (3-benzoxy-4-hydroxy-benzaldehyde) disclosed in Alt, U. S. Patent No. 2,027,361, and various higher alkl ethers of protocatechuic aldehyde such as 3-propoxy, 3-butoxy, 3-pentoxy, 3-hexoxy, 3-heptoxy, and 3-octoxy-4 hydroxy benzaldehydes disclosed in my Patent No. 2,027,387.

I have now discovered that the phenyl and cyclohexyl ethers of protocatechuic aldehyde (3-phenoxy and 3-cyclohexoxy-4-hydroxy-benzaldehydes) whose preparations are disclosed in my copending application, Serial No. 53,903, filed December 11, 1935, which has issued as Patent No. 2,168,349, of which this application is a continuation-in-part, and their homologues are also materials having a flavor similar to that of vanillin and that they possess desirable characteristics for modifying and fortifying the flavor of vanillin. The materials themselves possess a characteristic pleasant flavor somewhat resembling that of vanillin itself but distinguished therefrom in being somewhat more floral in nature. They are also distinguished from the benzyl and alkyl ethers of protocatechuic aldehyde. Because of their characteristics, the phenyl and cyclohexyl ethers are somewhat more suitable than vanillin for the preparation of certain perfumery products.

The phenyl and cyclohexyl ethers of protocatechuic aldehyde of my invention may be prepared in a number of ways, but I prefer to follow that method disclosed in my hereinabove identified copending application, Serial No. 53,903 (Patent No. 2,168,349), which method is illustrated in the examples which follow. Other methods of preparing the compounds of my invention are also illustrated in the examples which follow.

The starting materials, regardless of the methods of synthesis disclosed in the examples, are the monophenyl ether of pyrocatechol (2-phenoxy phenol or 2-hydroxy diphenyl ether) or the monocyclohexyl ether of pyrocatechol (2-cyclohexoxy phenol or 2-hydroxy-phenyl cyclohexyl ether) or the corresponding homologues. The former compound may be prepared by the synthesis of Ullmann and Stein (Berichte der deutschen Chemische Gesellschaft, 1906, vol. 39, page 623) consisting in heating guaiacol, bromobenzen and alcoholic potassium hydroxide solution at 220 to 230° C. in the presence of copper or by heating 2-bromoanisol, phenol and alcoholic potassium hydroxide solution at 190° to 215° C. in the presence of copper, and recovering the 2-methoxy diphenyl ether (2-phenoxy anisol); the recovered methoxy diphenyl ether is thereafter dissolved in benzene and converted to the 2-phenoxy phenol (2-hydroxy diphenyl ether) by boiling with anhydrous aluminum chloride.

Other methods of synthesis are available, such as that of Norris, Macintire and Corse (American Chemical Journal, 1903, vol. 29, pages 120 to 129) which consists briefly in decomposing pyrocatechol with benzene diazonium chloride whereby hydroxy diphenyl ether together with other products is obtained. The 2-cyclohexoxy phenol (2-hydroxy phenyl cyclohexyl ether) may be made by similar syntheses by substituting the cyclohexyl derivative for the phenyl derivative, for example, bromocyclohexane for bromobenzene, and cyclohexanol for phenol in the Ullmann and Stein syntheses. However, I prefer to use a method which, although not satisfactory for preparing the phenyl derivative, is eminently suitable for preparing the cyclohexyl derivative, which consists in condensing pyrocatechol with bromocyclohexane or chlorocyclohexane. The alkyl-substituted phenyl or cyclohexyl derivatives can be made by substituting the corresponding alkyl-substituted compound in the foregoing syntheses.

*Example 1.*—Into a suitable container are charged 46.5 parts by weight of monophenyl ether of pyrocatechol (2-hydroxy diphenyl ether) and 43.5 parts by weight of chloral hydrate together with 44 parts by weight of benzene. The container should be provided with a stirrer. The mass is then maintained at a temperature of about 25° to 30° C. These proportions correspond to approximately equimolecular proportions of the monophenyl ether of pyrocatechol (molecular weight 186) and chloral hydrate (molecular weight 165.5) the latter being in slight (5%) excess. To this mixture is added a dry mixture consisting of 15.8 parts by weight of sodium sulfite (molecular weight 126) and 2.6 parts by weight of anhydrous sodium carbonate (molecular weight 106), which correspond to molecular proportions of approximately 1/2 and 1/10, respectively, on the basis of the molecular proportions of the monophenyl ether of pyrocatechol. This reaction mixture is thereafter maintained at about 25° to 30° C. for from two to three weeks, during which time any solid materials settling upon the sides of the container are washed down periodically with small portions of benzene. Three washings, corresponding to about 44 parts by weight of benzene, are generally adequate for this purpose.

After this period of from two to three weeks the solids present in the reaction mixture are filtered off and washed on the filter with benzene. The product on the filter is then dried. The dried material is then mixed with 75 parts by weight of water in order to form a slurry and is again subjected to filtration and again dried. The material is subsequently purified by recrystallization from dilute alcohol. The product is substantially pure 3-phenoxy-4-hydroxy-phenyl trichloromethyl carbinol which is then converted to the corresponding aldehyde by hydrolysis and oxidation.

For the hydrolysis and oxidation the carbinol is charged into an autoclave in the ratio of 4.2 parts by weight of carbinol to 1.2 parts by weight of potassium dichromate, 6.4 parts by weight of 50% sodium hydroxide solution and 50 parts by weight of water. The charge in the autoclave is thereafter heated to 150° C. and held at this temperature for a period of two hours or thereabout and is then cooled and extracted with chloroform. The crude material, consisting substantially of 3-phenoxy-4-hydroxybenzaldehyde, is then further purified by recrystallization from 95% alcohol.

The foregoing reactions can be represented diagrammatically as follows:

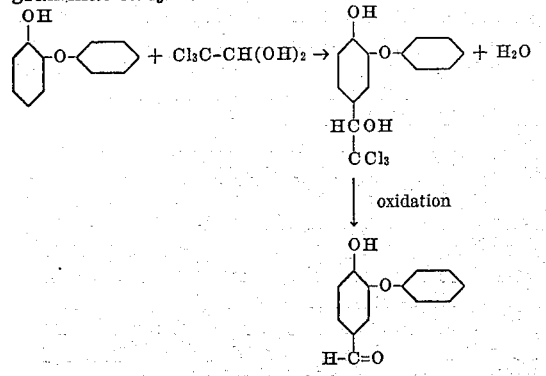

Metallic copper powder (for example, 3 parts by weight on the basis of the above proportions) may be added to the oxidation reaction mixture or the autoclave may be copper lined, to facilitate the reaction. Before extraction of the oxidation reaction mixture with chloroform the mixture may be neutralized to Congo red indicator with sulfuric acid. In the foregoing preparation the trichloromethyl carbinol may be formed from chloral and a small proportion of water instead of from chloral hydrate, if desired. The resulting substituted benzaldehyde derivative can be purified by distillation under high vacuum if desired and other solvents may be used for the recrystallization as is obvious. Alkali metal salts of the ethers may be used instead of the ethers in the condensation.

Instead of using potassium dichromate as the oxidizing agent other oxidizing agents such as potassium permanganate may be used in the foregoing preparation. The procedure should be modified accordingly to take into account the difference in oxidizing power and capacities of the oxidizing agents and suitable changes in the acidity also should be made.

The procedures of this example may also be varied as described in U. S. Patents Numbers 1,819,132; 2,154,979 and 1,873,630; and British Patents Numbers 344,675; 453,482 and 477,317.

*Example 2.*—3-cyclohexoxy-4-hydroxy-benzaldehyde may be prepared as in Example 1 by starting with an equivalent proportion of the cyclohexyl ether of pyrocatechol (2-cyclohexoxy phenol or 2-hydroxy phenyl cyclohexyl ether) instead of the phenyl ether of pyrocatechol. The quantity of the cyclohexyl ether of pyrocatechol (molecular weight 192) will then be 48 parts by weight in Example 1.

*Example 3.*—Ten parts of glyoxylic acid (molecular weight 92 for HOOC—CHO+H$_2$O) in aqueous solution are neutralized with sodium hydroxide solution. To this are then added 30 parts of the phenyl ether of pyrocatechol and 13 parts of 50% sodium hydroxide solution and the mixture is stirred until the solids have dissolved. The solution is allowed to stand for several days and is thereafter made slightly acid to Congo red indicator by the addition of dilute sulfuric acid and extracted with benzene to remove unreacted phenyl ether of pyrocatechol. The solution is then made alkaline by addition of about 36 parts of 50% sodium hydroxide solution and subsequently 55 parts of copper sulfate pentahydrate (CuSO$_4$·5H$_2$O) are added to oxidize the condensation product. This mixture is then stirred and treated for about 3 hours at 90° to 100° C. The mixture is thereafter neutralized and the liquid is filtered from the copper sludge and extracted with ether. The ether extract is then treated for recovery of the 3-phenoxy-4-hydroxy-benzaldehyde. This is accomplished by distilling off the ether and extracting and recrystallizing the residue by means of solvents as in Example 1 or the residue on evaporation of the ether can be distilled in high vacuum. The product may be further recrystallized from benzene, hexahydrotoluene or other suitable solvent.

The reactions involved in this preparation can be represented diagrammatically as follows:

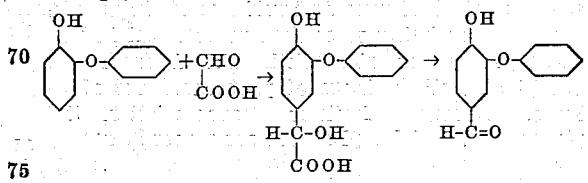

The process may be varied by substituting other oxidizing agents for the copper oxide, as is known, for example, as described in U. S. Patent No. 2,062,205 or by varying the procedure in other manners as is disclosed therein and in British Patent No. 401,562.

*Example 4.*—By substituting the cyclohexyl ether of pyrocatechol for the phenyl ether in Example 3 and proceeding as therein described, the 3-cyclohexoxy-4-hydroxybenzaldehyde can be prepared.

*Example 5.*—3-Phenoxy-4-hydroxy-benzaldehyde and 3-cyclohexoxy-4-hydroxy-benzaldehyde can be prepared from the corresponding pyrocatechol ethers by condensation with formaldehyde according to the Geigy reaction as described in German Patent No. 105,798.

Other methods, for example, those described in U. S. Patent No. 543,193, can be adapted to the preparation of the compounds of the present invention.

The corresponding alkyl-substituted phenyl or cyclohexyl ethers of protocatechuic aldehyde can be made by substituting the corresponding alkyl phenyl or alkyl cyclohexyl derivative in the synthesis. Typical compounds of this class are 3-methylphenoxy-4-hydroxy-benzaldehyde (which may be called the cresyl ether of protocatechuic aldehyde to distinguish it from the tolyl ether of protocatechuic aldehyde disclosed in Alt, U. S. Patent No. 2,027,361), 3-ethylphenoxy-4-hydroxy-benzaldehyde, and the like.

In the production of flavoring compositions from the vanillin analogues of the present invention, partial or complete substitutions of the compounds for the vanillin can be made to obtain compositions of desired flavors. One such composition consists of 0.3 to 0.4 ounce of 3-phenoxy-4-hydroxy-benzaldehyde in 2.5 gallons of 190-proof ethyl alcohol, which is thereafter dissolved in 10 gallons of water sweetened with 15 pounds of sugar. Some coumarin (1 to 2 ounces) may be added to the alcohol before dilution if desired. A blended flavor more closely simulating vanilla bean extract may be made by using from 0.1 to 0.2 ounce of 3-phenoxy-4-hydroxy benzaldehyde and 4 to 4.5 ounces of vanillin in substitution for the 0.3 to 0.4 ounce of the 3-phenoxy-4-hydroxy-benzaldehyde in the above formula.

Inasmuch as the foregoing description comprises preferred embodiments, it is to be understood that the invention is not limited thereto and that modifications and variations may be made therein without departing substantially from the invention and the scope of the appended claims.

I claim:

1. A compound having the following general structural formula

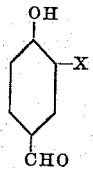

in which X is selected from the group consisting of phenoxy, methylphenoxy, ethylphenoxy and cyclohexoxy radicals.

2. The compound, 3-phenoxy-4-hydroxy-benzaldehyde.

3. The compound, 3-cyclohexoxy-4-hydroxy-benzaldehyde.

LUCAS P. KYRIDES.